US008591121B2

(12) United States Patent
Suzuki et al.

(10) Patent No.: US 8,591,121 B2
(45) Date of Patent: Nov. 26, 2013

(54) ROLLING BEARING CAGE AND ASSEMBLY

(75) Inventors: Kazuya Suzuki, Kashiwara (JP);
Yuichiro Hayashi, Yao (JP)

(73) Assignee: Jtekt Corporation, Osaka-shi (JP)

( * ) Notice: Subject to any disclaimer, the term of this patent is extended or adjusted under 35 U.S.C. 154(b) by 556 days.

(21) Appl. No.: 12/753,999

(22) Filed: Apr. 5, 2010

(65) Prior Publication Data

US 2010/0254645 A1 Oct. 7, 2010

(30) Foreign Application Priority Data

Apr. 6, 2009 (JP) ................................. 2009-092251
Oct. 22, 2009 (JP) ................................. 2009-243628

(51) Int. Cl.
*F16C 33/48* (2006.01)
*F16C 33/46* (2006.01)

(52) U.S. Cl.
USPC ........................................... 384/572; 384/580

(58) Field of Classification Search
USPC .................. 384/572, 575, 576, 580, 621, 623
See application file for complete search history.

(56) References Cited

U.S. PATENT DOCUMENTS

| 3,733,111 | A | * | 5/1973 | Harlan et al. ................. 384/576 |
| 3,881,790 | A | | 5/1975 | Ryanen |
| 4,222,620 | A | * | 9/1980 | Mirring ......................... 384/576 |
| 6,599,019 | B2 | * | 7/2003 | Matsui et al. ................. 384/450 |
| 6,715,927 | B1 | * | 4/2004 | Torisawa et al. .............. 384/572 |
| 7,594,761 | B2 | * | 9/2009 | Koyama et al. .............. 384/572 |
| 2001/0003548 | A1 | * | 6/2001 | Straub et al. ................. 384/580 |
| 2004/0234184 | A1 | | 11/2004 | Koyama et al. |
| 2007/0003178 | A1 | * | 1/2007 | Koyama ....................... 384/470 |

FOREIGN PATENT DOCUMENTS

| JP | A-07-012131 | 1/1995 |
| JP | A-2004-316757 | 11/2004 |
| JP | A-2006-132622 | 5/2006 |
| JP | A-2006-138340 | 6/2006 |

OTHER PUBLICATIONS

Extended European Search Report issued in European Application No. 10159126.1 on Dec. 27, 2011.
Apr. 16, 2013 Office Action issued in Japanese Patent Application No. 2009-243628 (with partial English translation).

* cited by examiner

*Primary Examiner* — Thomas R Hannon
*Assistant Examiner* — Adam D Rogers
(74) *Attorney, Agent, or Firm* — Oliff & Berridge, PLC

(57) ABSTRACT

In a rolling bearing cage, adjacent cage bar portions on both sides of each pocket have protrusions protruding toward the pocket and a radially outer side and retaining a rolling element, accommodated in the pocket, from the radially outer side, a side surface of each cage bar portion and the corresponding protrusion, facing the pocket, has a guide surface slidably guiding the rolling element, the guide surface includes a first circular arc surface having a concave shape corresponding to an outer peripheral surface of each rolling element, and a side surface of each protrusion, facing the pocket, has a second circular arc surface having a convex shape smoothly continuous with a radially outer side of the first circular arc surface and an introducing surface smoothly continuous with a radially outer side of the second circular arc surface and inclined to a side opposite to the pocket toward a distal end of the protrusion.

6 Claims, 9 Drawing Sheets

F I G. 4
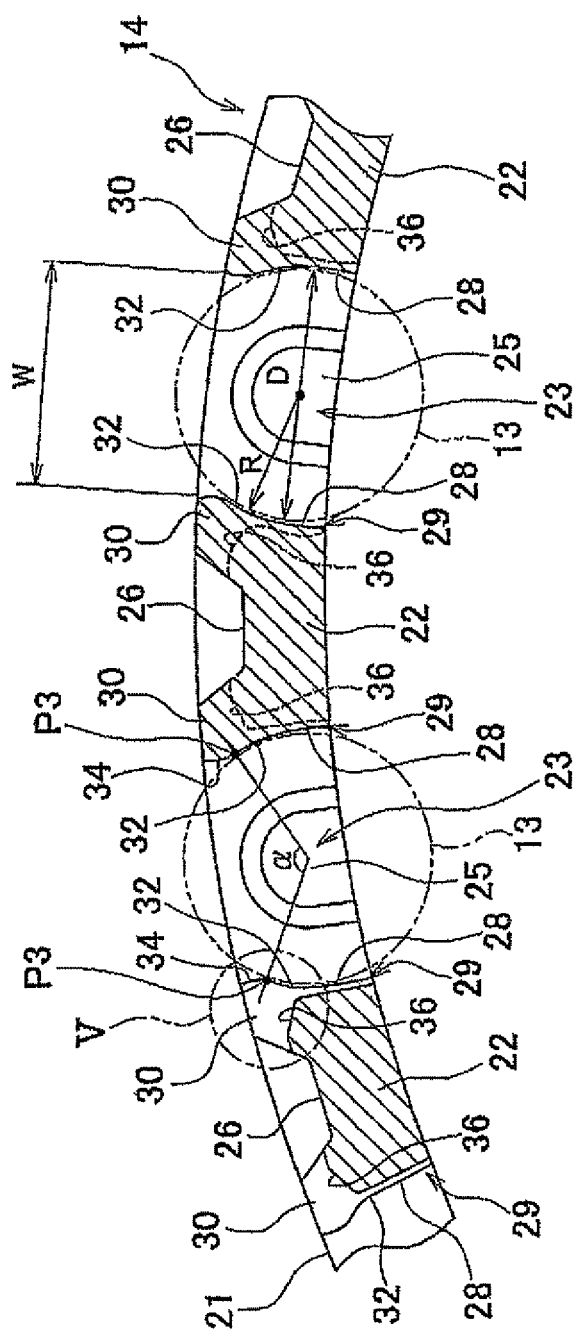

F I G . 5
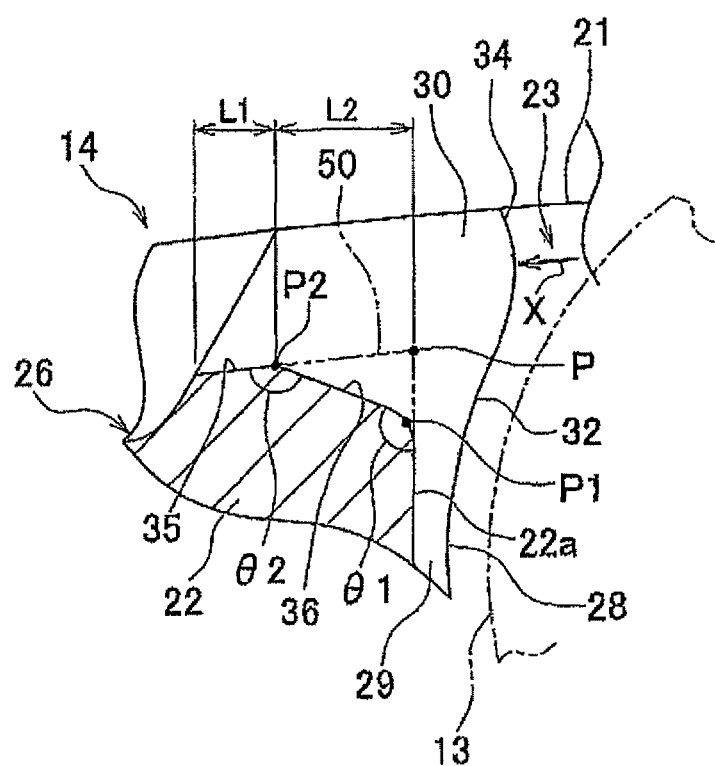

ROLLING BEARING CAGE AND ASSEMBLY

INCORPORATION BY REFERENCE

The disclosure of Japanese Patent Applications No. 2009-092251 and 2009-243628 filed on Apr. 6, 2009 and Oct. 22, 2009, respectively, including the specification, drawings and abstract is incorporated herein by reference in its entirety.

BACKGROUND OF THE INVENTION

1. Field of the Invention

The invention relates to a rolling bearing cage that is able to suitably support a high-speed rotating shaft of a machine tool, or the like, and an inner ring, cage and rolling element assembly, an outer ring, cage and rolling element assembly and a rolling bearing that are provided with the rolling bearing cage.

2. Description of the Related Art

Japanese Patent Application Publication No. 2004-316757 (JP-2004-316757) describes a rolling bearing used to support a main shaft of a machine tool. The main shaft of the machine tool is supported by different rolling bearings at a tool side and at a side opposite to the tool side. In order to relieve thermal expansion, or the like, of the main shaft, a cylindrical roller bearing that allows an axial displacement of the main shaft is used at the side opposite to the tool side. The cylindrical roller bearing includes an inner ring, an outer ring, a plurality of cylindrical rollers and a cage. The inner ring has a raceway on its outer periphery. The outer ring has a raceway on its inner periphery. The plurality of cylindrical rollers are arranged between the respective raceways of the inner and outer rings so as to freely roll along the raceways. The cage holds the cylindrical rollers at a predetermined interval in the circumferential direction.

In addition, the cage used in the cylindrical roller bearing described in JP-A-2004-316757 is made of synthetic resin. As shown in FIG. 8, the cage includes an axial pair of annular portions 121 and a plurality of cage bar portions 122. The axial pair of annular portions are formed in an annular shape. The plurality of cage bar portions 122 are arranged in the circumferential direction and are spanned between the axial pair of annular portions 121. A pocket 123 is formed between the pair of annular portions 121 and any adjacent cage bar portions 122 in the circumferential direction. Each pocket 123 accommodates a corresponding one of the cylindrical rollers 113. Both ends of each cage bar portion 122 in the circumferential direction each have a protrusion 130 that protrudes toward the pocket 123 and toward a radially outer side. The protrusions 130 of each cage bar portion 122 are formed in a bifurcate shape. When a cylindrical roller bearing that uses the above cage 114 is assembled, first, in the intermediate stage, the cage 114 is placed on the outer peripheral side of the inner ring 112, and then the cylindrical rollers 113 are respectively accommodated in the pockets 123 of the cage 114. By so doing, an inner ring, cage and rolling element assembly is assembled. In a state of the inner ring, cage and rolling element assembly, the cylindrical rollers 113 in the respective pockets 123 are retained by the protrusions 130 so as not to come off radially outward. Then, an outer ring 111 is fitted to an outer peripheral portion of the inner ring, cage and rolling element assembly to thereby assemble the cylindrical roller bearing.

In JP-A-2004-316757, when the main shaft of the machine tool rotates at high speed, contact force between the cage 114 and cylindrical rollers 113 of the cylindrical roller bearing also increases. Therefore, each cylindrical roller 113 accommodated in the pocket 123 bite into between the protrusions 130 on both sides thereof to thereby increase rotational resistance. Thus, in order to support the high-speed rotation of the main shaft by preventing each cylindrical roller 113 from biting into between the protrusions 130, it is required to enhance the rigidity of each protrusion 130.

On the other hand, when the inner ring, cage and rolling element assembly of the cylindrical roller bearing described in JP-A-2004-316757 is assembled, it is necessary that each cylindrical roller 113 is pushed in from the radially outer side into between any adjacent protrusions 130 formed on both sides of the pocket 123 in the circumferential direction to elastically deform the protrusions 130 so as to expand circumferentially outward. Therefore, if the rigidity of each protrusion 130 is excessively high, there is a problem that it is difficult to assemble the cylindrical rollers 113 and, in addition, local stress easily occurs at a proximal portion (particularly, a boundary portion P between an outer peripheral surface 136 and a side surface of each cage bar portion 122) of each protrusion 130.

In addition, the cage used in the cylindrical roller bearing described in JP-A-2004-316757 is made of synthetic resin. As shown in FIG. 9A, the cage includes an axial pair of annular portions 121 and a plurality of cage bar portions 122. The axial pair of annular portions are formed in an annular shape. The plurality of cage bar portions 122 are arranged in the circumferential direction and are spanned between the axial pair of annular portions 121. A pocket 123 is formed between the pair of annular portions 121 and any adjacent cage bar portions 122 in the circumferential direction. Each pocket 123 accommodates a corresponding one of the cylindrical rollers 113.

When a cylindrical roller bearing that uses the above cage 114 is assembled, first, in the intermediate stage, the cage 114 is placed on the outer peripheral side of the inner ring 112, and then the cylindrical rollers 113 are respectively accommodated in the pockets 123 of the cage 114. By so doing, an inner ring, cage and rolling element assembly is assembled. In a state of the inner ring, cage and rolling element assembly, the cylindrical rollers 113 in the respective pockets 123 are retained by the protrusions 130 arranged on both sides thereof so as not to come off radially outward. Then, the outer ring 111 is fitted to the outer peripheral portion of the inner ring, cage and rolling element assembly to thereby finish the cylindrical roller bearing.

In addition, in JP-A-2004-316757, the side surface of each protrusion 130 at the distal end side has an inclined surface 130a as shown in FIGS. 8, 9A, and 9B to thereby make it easy to introduce the cylindrical rollers 113 into the pockets 123; however, an edge portion 130c is present between the inclined surface 130a and a side surface 130b that is continuous with the inclined surface 130a, so there is a problem that each cylindrical roller 113 strongly contacts the edge portion 130e to cause the protrusion 130 to be easily damaged.

In addition, when the main shaft of the machine tool rotates at high speed, each cylindrical roller 113 accommodated in the pocket 123 tries to bite into between the pair of protrusions 130 on both sides thereof. However, an edge portion 130e is present between a concave side surface 130d of the protrusion, formed at the pocket 123 side, and the side surface 130b that is continuous with the radially outer side of the side surface 130d. Therefore, the cylindrical roller 113 strongly contacts the edge portion 130e to thereby damage the protrusion 130 at the edge portion 130e or to generate excessive heat in the protrusion 130 at the edge portion 130e. This has interfered with high-speed rotation of the cylindrical roller bearing.

SUMMARY OF THE INVENTION

The invention provides a rolling bearing cage that is able to suitably support a high-speed rotating shaft of a machine tool, or the like, and an inner ring, cage and rolling element assembly, an outer ring, cage and rolling element assembly and a rolling bearing that are provided with the rolling bearing cage.

A first aspect of the invention relates to a rolling bearing cage. The rolling bearing cage includes: first and second annular portions that are formed in an annular shape and that are concentrically provided parallel to each other; a plurality of cage bar portions that are spanned between the first and second annular portions at a constant interval in a circumferential direction of the first annular portion; and a plurality of pockets that are defined by the first and second annular portions and two adjacent ones of the plurality of cage bar portions and that are provided in the circumferential direction of the first annular portion, wherein each pocket accommodates a corresponding one of rolling elements of the rolling bearing, wherein each of two adjacent ones of the plurality of cage bar portions that sandwich a corresponding one of the pockets has a protrusion that protrudes toward the pocket and a radially outer side of the first annular portion and that retains a corresponding one of the rolling elements from the radially outer side of the first annular portion, a side surface of each cage bar portion and the corresponding protrusion, facing the pocket, has a guide surface that slidably guides a corresponding one of the rolling elements, the guide surface includes a first circular arc surface that is formed in a concave shape corresponding to an outer peripheral surface of each rolling element, and a side surface of each protrusion, facing the pocket, has a second circular arc surface that is formed in a convex shape, and that is smoothly continuous with a radially outer side of the first circular arc surface and an introducing surface that is smoothly continuous with a radially outer side of the second circular arc surface and that is inclined to a side opposite to the pocket toward a distal end of the protrusion.

Note that, in the above described configuration, the phrase "smoothly continuous" means that adjacent two surfaces are continuous with each other without forming an edge portion, that is, two surfaces may be differentiated with respect to a connection point.

With the above described configuration, the side surface of each protrusion, adjacent to the pocket, has the second circular arc surface that is smoothly continuous with the first circular arc surface of the guide surface, and there is no edge portion therebetween. Therefore, during high-speed rotation, when each rolling element tries to bite into between any adjacent protrusions, it is possible to prevent a situation that the rolling element strongly contacts part of the side surface of the protrusions to damage the protrusions or increase heat generated in the protrusions. By so doing, the high-speed rotation performance of the rolling bearing may be enhanced. In addition, the side surface of each protrusion, adjacent to the pocket, has the introducing surface that is smoothly continuous with the second circular arc surface, and there is no edge portion therebetween. Therefore, during assembling an inner ring, cage and rolling element assembly or an outer ring, cage and rolling element assembly, when each rolling element is pushed into between any adjacent protrusions via the introducing surfaces, the gap between any adjacent protrusions is easily expanded, and it is possible to prevent each rolling element from strongly contacting part of the side surface of each protrusion to damage the protrusion.

In the above configuration, each protrusion may be provided between first and second outer peripheral surfaces of a corresponding one of the cage bar portions, and the first and second outer peripheral surfaces may be adjacent respectively to a proximal portion of the protrusion in an axial direction of the first annular portion, and at least one of the first and second outer peripheral surfaces may have an inclined surface that is gradually inclined to a radially inner side toward the pocket.

With the above configuration, the outer peripheral surface of each cage bar portion has the inclined surface. Thus, when each protrusion is elastically deformed in order to accommodate a corresponding one of the rolling elements into the pocket, it is possible to prevent local stress from occurring at the proximal portion of each protrusion. In addition, because only the inclined surface is formed on the outer peripheral surface of each cage bar portion, a decrease in rigidity of each protrusion is small, so it is possible to support high-speed rotation.

In addition, in the above configuration, each of the first and second outer peripheral surfaces may have the inclined surface. By so doing, it is possible to further reliably prevent local stress from occurring at the proximal portion of each protrusion.

A second aspect of the invention relates to an inner ring, cage and rolling element assembly. The inner ring, cage and rolling element assembly includes: an inner ring that has a raceway on its outer peripheral surface and that has a rib portion protruding toward a radially outer side on at least one side of the raceway in an axial direction; a cage that is arranged on a radially outer side of the inner ring and that includes first and second annular portions that are formed in an annular shape and that are concentrically provided parallel to each other, a plurality of cage bar portions that are spanned between the first and second annular portions at a constant interval in a circumferential direction of the first annular portion, and a plurality of pockets that are defined by the first and second annular portions and two adjacent ones of the plurality of cage bar portions and that are provided in the circumferential direction of the first annular portion, wherein each pocket accommodates a corresponding one of rolling elements of a rolling bearing, wherein each of two adjacent ones of the plurality of cage bar portions that sandwich a corresponding one of the pockets has a protrusion that protrudes toward the pocket and a radially outer side of the first annular portion and that retains a corresponding one of the rolling elements from the radially outer side of the first annular portion, a side surface of each cage bar portion and the corresponding protrusion, facing the pocket, has a guide surface that slidably guides a corresponding one of the rolling elements, the guide surface includes a first circular arc surface that is formed in a concave shape corresponding to an outer peripheral surface of each rolling element, and a side surface of each protrusion, facing the pocket, has a second circular arc surface that is formed in a convex shape, and that is smoothly continuous with a radially outer side of the first circular arc surface and an introducing surface that is smoothly continuous with a radially outer side of the second circular arc surface and that is inclined to a side opposite to the pocket toward a distal end of the protrusion; and the plurality of rolling elements that are accommodated in the respective pockets of the cage and that are arranged so as to freely roll along the raceway of the inner ring.

A third aspect of the invention relates to a rolling bearing. The rolling bearing includes: an outer ring that has a raceway on its inner peripheral surface; an inner ring that has a raceway on its outer peripheral surface and that has a rib portion protruding toward a radially outer side on at least one side of the raceway in an axial direction; a cage that is radially arranged between the outer ring and the inner ring and that includes first and second annular portions that are formed in an annular shape and that are concentrically provided parallel to each other, a plurality of cage bar portions that are spanned between the first and second annular portions at a constant interval in a circumferential direction of the first annular portion and a plurality of pockets that are defined by the first and second annular portions and two adjacent ones of the plurality of cage bar portions and that are provided in the circumferential direction of the first annular portion, wherein each pocket accommodates a corresponding one of rolling elements of the rolling bearing, wherein each of two adjacent ones of the plurality of cage bar portions that sandwich a corresponding one of the pockets has a protrusion that protrudes toward the pocket and a radially outer side of the first annular portion and that retains a corresponding one of the rolling elements from the radially outer side of the first annular portion, a side surface of each cage bar portion and the corresponding protrusion, facing the pocket, has a guide surface that slidably guides a corresponding one of the rolling elements, the guide surface includes a first circular arc surface that is formed in a concave shape corresponding to an outer peripheral surface of each rolling element, and a side surface of each protrusion, facing the pocket, has a second circular arc surface that is formed in a convex shape, and that is smoothly continuous with a radially outer side of the first circular arc surface and an introducing surface that is smoothly continuous with a radially outer side of the second circular arc surface and that is inclined to a side opposite to the pocket toward a distal end of the protrusion; and the plurality of rolling elements that are accommodated in the respective pockets of the cage and that are arranged so as to freely roll along the raceway of the outer ring and the raceway of the inner ring.

A fourth aspect of the invention relates to a rolling bearing cage. The rolling bearing cage includes: first and second annular portions that are formed in an annular shape and that are concentrically provided parallel to each other; a plurality of cage bar portions that are spanned between the first and second annular portions at a constant interval in a circumferential direction of the first annular portion; and a plurality of pockets that are defined by the first and second annular portions and two adjacent ones of the plurality of cage bar portions and that are provided in the circumferential direction of the first annular portion, wherein each pocket accommodates a corresponding one of rolling elements of the rolling bearing, wherein each of two adjacent ones of the plurality of cage bar portions that sandwich a corresponding one of the pockets has a protrusion that protrudes toward the pocket and a radially inner side of the first annular portion and that retains a corresponding one of the rolling elements from the radially inner side of the first annular portion, a side surface of each cage bar portion and the corresponding protrusion, facing the pocket, has a guide surface that slidably guides a corresponding one of the rolling elements, the guide surface includes a first circular arc surface that is formed in a concave shape corresponding to an outer peripheral surface of each rolling element, and a side surface of each protrusion, facing the pocket, has a second circular arc surface that is formed in a convex shape, and that is smoothly continuous with a radially inner side of the first circular arc surface and an introducing surface that is smoothly continuous with a radially inner side of the second circular arc surface and that is inclined to a side opposite to the pocket toward a distal end of the protrusion.

In addition, in the above configuration, each protrusion may be provided between first and second inner peripheral surfaces of a corresponding one of the cage bar portions, and the first and second inner peripheral surfaces may be adjacent respectively to a proximal portion of the protrusion in an axial direction of the first annular portion, and at least one of the first and second inner peripheral surfaces may have an inclined surface that is gradually inclined to a radially outer side to the pocket.

With the above configuration, the inner peripheral surface of each cage bar portion has the inclined surface. Thus, when each protrusion is elastically deformed in order to accommodate a corresponding one of the rolling elements into the pocket, it is possible to prevent local stress from occurring at the proximal portion of each protrusion. In addition, because only the inclined surface is formed on the inner peripheral surface of each cage bar portion, a decrease in rigidity of each protrusion is small, so it is possible to support high-speed rotation.

In addition, in the above configuration, each of the first and second inner peripheral surfaces may have the inclined surface. By so doing, it is possible to further reliably prevent local stress from occurring at the proximal portion of each protrusion.

A fifth aspect of the invention relates to an outer ring, cage and rolling element assembly. The outer ring, cage and rolling element assembly includes: an outer ring that has a raceway on its inner peripheral surface and that has a rib portion protruding toward a radially inner side on at least one side of the raceway in an axial direction; a cage that is arranged on a radially inner side of the outer ring and that includes first and second annular portions that are formed in an annular shape and that are concentrically provided parallel to each other, a plurality of cage bar portions that are spanned between the first and second annular portions at a constant interval in a circumferential direction of the first annular portion, and a plurality of pockets that are defined by the first and second annular portions and two adjacent ones of the plurality of cage bar portions and that are provided in the circumferential direction of the first annular portion, wherein each pocket accommodates a corresponding one of rolling elements of a rolling bearing, wherein each of two adjacent ones of the plurality of cage bar portions that sandwich a corresponding one of the pockets has a protrusion that protrudes toward the pocket and a radially inner side of the first annular portion and that retains a corresponding one of the rolling elements from the radially inner side of the first annular portion, a side surface of each cage bar portion and the corresponding protrusion, facing the pocket, has a guide surface that slidably guides a corresponding one of the rolling elements, the guide surface includes a first circular arc surface that is formed in a concave shape corresponding to an outer peripheral surface of each rolling element, and a side surface of each protrusion, facing the pocket, has a second circular arc surface that is formed in a convex shape, and that is smoothly continuous with a radially inner side of the first circular arc surface and an introducing surface that is smoothly continuous with a radially inner side of the second circular arc surface and that is inclined to a side opposite to the pocket toward a distal end of the protrusion; and the plurality of rolling elements that are accommodated in the respective pockets of the cage and that are arranged so as to freely roll along the raceway of the outer ring.

A sixth aspect of the invention relates to a rolling bearing. The rolling bearing includes: an inner ring that has a raceway on its outer peripheral surface; an outer ring that has a raceway on its inner peripheral surface and that has a rib portion protruding toward a radially inner side on at least one side of the raceway in an axial direction; a cage that is radially arranged between the outer ring and the inner ring and that includes first and second annular portions that are formed in an annular shape and that are concentrically provided parallel to each other, a plurality of cage bar portions that are spanned between the first and second annular portions at a constant interval in a circumferential direction of the first annular portion and a plurality of pockets that are defined by the first and second annular portions and two adjacent ones of the plurality of cage bar portions and that are provided in the circumferential direction of the first annular portion, wherein each pocket accommodates a corresponding one of rolling elements of the rolling bearing, wherein each of two adjacent ones of the plurality of cage bar portions that sandwich a corresponding one of the pockets has a protrusion that protrudes toward the pocket and a radially inner side of the first annular portion and that retains a corresponding one of the rolling elements from the radially inner side of the first annular portion, a side surface of each cage bar portion and the corresponding protrusion, facing the pocket, has a guide surface that slidably guides a corresponding one of the rolling elements, the guide surface includes a first circular arc surface that is formed in a concave shape corresponding to an outer peripheral surface of each rolling element, and a side surface of each protrusion, facing the pocket, has a second circular arc surface that is formed in a convex shape, and that is smoothly continuous with a radially inner side of the first circular arc surface and an introducing surface that is smoothly continuous with a radially inner side of the second circular arc surface and that is inclined to a side opposite to the pocket toward a distal end of the protrusion; and the plurality of rolling elements that are accommodated in the respective pockets of the cage and that are arranged so as to freely roll along the raceway of the outer ring and the raceway of the inner ring.

According to the aspects of the invention, each rolling element may be smoothly inserted into a corresponding one of the pockets of the cage without damaging the protrusions, and, during rotation of the rolling bearing, damage to the protrusions or an increase in heat generated in the protrusions due to each rolling element that tries to bite into between any adjacent protrusions is suppressed to thereby make it possible to enhance the high-speed rotation performance of the rolling bearing.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 4 is a cross-sectional view taken along the line IV-IV in FIG. 2;

FIG. 5 is an enlarged detail view of the portion V of the cage of the rolling bearing according to, the first embodiment in FIG. 4;

DETAILED DESCRIPTION OF EMBODIMENTS

Figure 1:
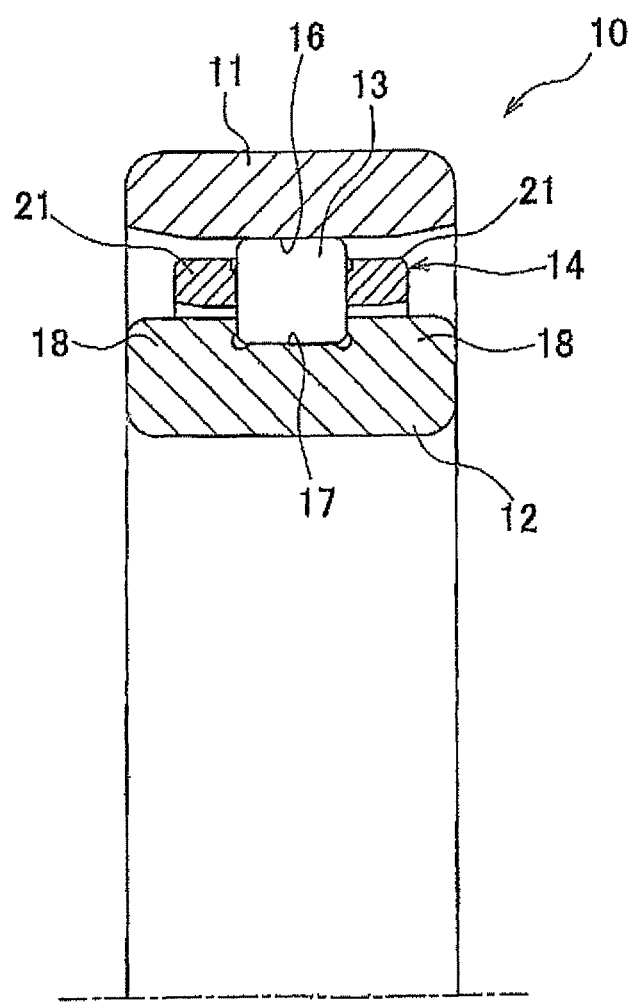
FIG. 1 is a cross-sectional view of a rolling bearing according to first and second embodiments of the invention.

Hereinafter, first and second embodiments of the invention will be described with reference to the accompanying drawings. FIG. 1 is a cross-sectional view of a rolling bearing 10 according to the first and second embodiments of the invention. The rolling bearing 10 includes an annular outer ring 11, an inner ring 12, a plurality of cylindrical rollers 13 and a cage 14. The inner ring 12 is arranged concentrically on the inner peripheral side of the outer ring 11. The plurality of cylindrical rollers 13 serve as rolling elements and are arranged between the outer ring 11 and the inner ring 12. The cage 14 holds these cylindrical rollers 13 at a predetermined interval in the circumferential direction.

The outer ring 11 is made of alloy steel, such as bearing steel, and is formed in an annular shape. The outer ring 11 has an outer ring raceway 16 on the inner periphery thereof in the circumferential direction. The cylindrical rollers 13 roll along the outer ring raceway 16. The inner ring 12 is also made of alloy steel, such as bearing steel, and is formed in an annular shape. The inner ring 12 has an inner ring raceway 17 on the outer periphery thereof so as to face the outer ring raceway 16. The cylindrical rollers 13 roll along the inner ring raceway 17. In addition, the inner ring 12 has inner ring rib portions 18 on its outer periphery. The inner ring rib portions 18 protrude radially outward on both sides of the inner ring raceway 17 in the axial direction. The inner ring rib portions 18 restrict displacement of each cylindrical roller 13 in the axial direction with respect to the inner ring 12.

Note that the outer ring 11 has no rib portion, and displacement of each cylindrical roller 13 in the axial direction on the outer ring raceway 16 is allowed. The plurality of cylindrical rollers 13 are allowed to roll along the outer ring raceway 16 and the inner ring raceway 17. By so doing, the outer ring 11 and the inner ring 12 are relatively rotatable.

Figure 2:
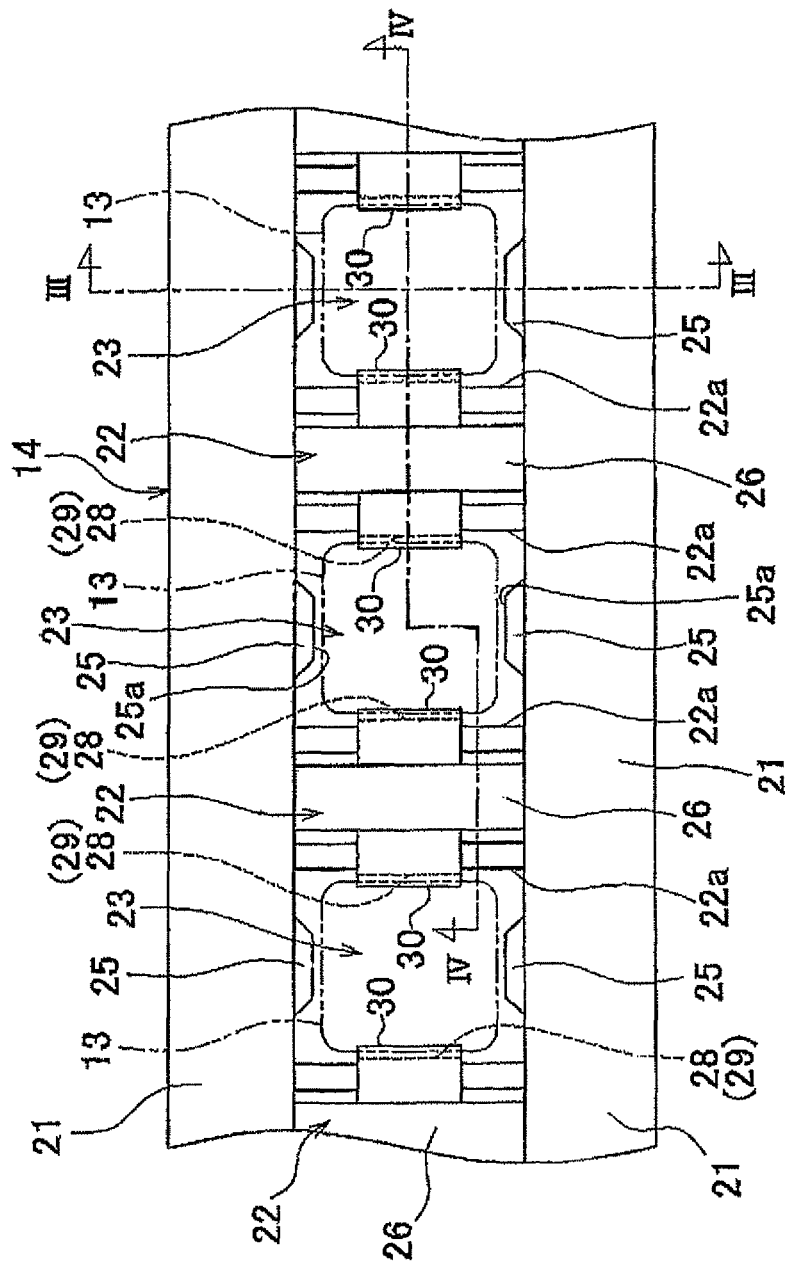
FIG. 2 is a plan view of a cage when viewed from the outer peripheral side of the cage.
Figure 3:
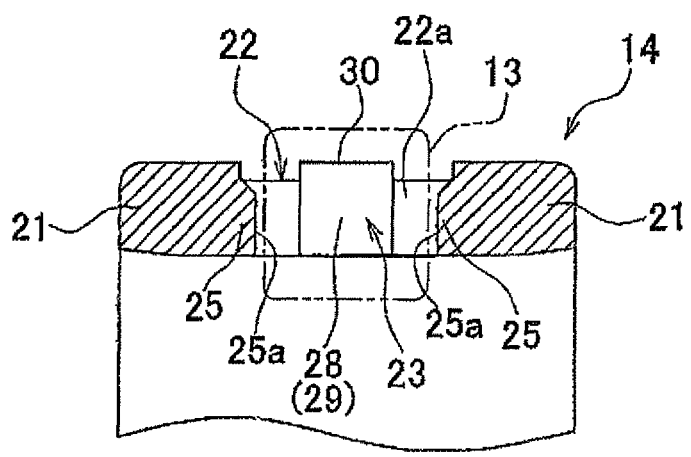
FIG. 3 is a cross-sectional view taken along the line III-III in FIG. 2.

FIG. 2 is a plan view of the cage 14 when viewed from the outer peripheral side of the cage. FIG. 3 is a cross-sectional view taken along the line III-III in FIG. 2. FIG. 4 is a cross-sectional view taken along the line IV-IV in FIG. 2. The cage 14 is made of synthetic resin, such as poly ether ketone (PEEK) resin that is reinforced by carbon fibers, or the like. As shown in FIG. 2, the cage 14 has a pair of annular portions 21 and a plurality of cage bar portions 22. The pair of annular portions 21 are formed in an annular shape and are arranged in the axial direction. The plurality of cage bar portions 22 are spanned between the pair of annular portions 21 and are arranged in the circumferential direction of the pair of annular portions 21. The plurality of cage bar portions 22 are arranged at a constant interval in the circumferential direction of the pair of annular portions 21. A substantially rectangular space is defined by the pair of annular portions 21 and the pair of cage bar portions 22 located adjacent to each other in the circumferential direction of the pair of annular portions 21. The substantially rectangular space serves as a pocket 23 that can accommodate a corresponding one of the cylindrical rollers 13. The cage 14 is arranged between the outer ring 11 and the inner ring 12 so as to be substantially concentric with respect to these rings. Note that the cage 14 may be made of polyamide resin.

As shown in FIG. 3, axial guide portions 25 are formed on axially inner side surfaces (side surfaces facing the pockets 23) of the pair of annular portions 21. The axial guide portions 25 are raised toward the pockets 23, and the distal end surfaces of the axial guide portions 25 are slidable over the axial end surfaces of the cylindrical rollers 13. The axial guide portions 25 restrict the position of each cylindrical roller 13 in the axial direction inside the pocket 23. In addition, as shown in FIG. 4, a recess 26 that is recessed toward a radially inner side is formed at the center of the outer peripheral surface of each cage bar portion 22 in the circumferential direction over the entire width of the cage bar portion 22 in the axial direction.

In addition, as shown in FIGS. 2, 3 and 4, circumferential guide portions 29 are formed respectively on circumferential side surfaces 22a of each cage bar portion 22 at the axial center portion. The circumferential guide portions 29 are raised toward the pockets 23, and the distal end surfaces (first guide surfaces 28) of the circumferential guide portions 29 are slidable over the outer peripheral surfaces of the cylindrical rollers 13. The first guide surfaces 28 are formed in a substantially flat surface, and restrict the positions of the cylindrical rollers 13 in the circumferential direction of the cage. Protrusions 30 are respectively formed at axial center portions at both sides of the outer peripheral surface of each cage bar portion 22 in the circumferential direction. Each protrusion 30 protrudes toward the pocket 23 and a radially outer side. The gap W (see FIG. 4) between the distal end portions of the protrusions 30 on both sides of each pocket 23 is smaller than the diameter of each cylindrical roller 13.

FIG. 5 is an enlarged view of the portion V of the cage of the rolling bearing according to the first embodiment in FIG. 4. The side surface of each protrusion 30, adjacent to the pocket 23, serves as a second guide surface 32 (first circular arc surface) that is smoothly continuous with the first guide surface 28 of the circumferential guide portion 29 and that is formed to curve in a concave shape. The radius of curvature of each second guide surface 32 is slightly larger than the radius of curvature of the outer peripheral surface of each cylindrical roller 13. The outer peripheral surface of each cylindrical roller 13 contacts a corresponding one of the second guide surfaces 32. This guides the cylindrical roller 13 and prevents the cylindrical roller 13 from coming off radially outward from the pocket 23 while assembling the cylindrical roller bearing 10.

That is, in the present embodiment, in a state where the cage 14 is placed on the outer peripheral side of the inner ring 12, each cylindrical roller 13 is fitted into a corresponding one of the pockets 23 while pushing to open the protrusions 30 on both sides of the pocket 23 in the circumferential direction. By so doing, an "inner ring, cage and rolling element assembly" in the intermediate stage is assembled. Then, the outer ring 11 is fitted to the outer peripheral portion of the inner ring, cage and rolling element assembly to thereby assemble the cylindrical roller bearing 10. The protrusions 30 have a function of preventing the cylindrical rollers 13 in the inner ring, cage and rolling element assembly from coming off radially outward from the pockets 23.

Note that a circular arc surface 34 is formed on the side surface of each protrusion 30 adjacent to the pocket 23 on the radially outer side with respect to the second guide surface 32. Each circular arc surface 34 curves in a convex shape so as to be smoothly continuous with the second guide surface 32. With the circular arc surfaces 34 (second circular arc surfaces and introduction surfaces), the protrusions 30 on both sides of each pocket 23 are easily expanded circumferentially outward when the cylindrical rollers 13 are pushed into the pockets 23 from the radially outer side during assembling the inner ring, cage and rolling element assembly. Further, each of these circular arc surfaces 34 includes an introduction surface that is inclined away from a corresponding one of the pockets 23 on a radially outer side of the second circular arc surface as a distal end of a corresponding one of the protrusions 30.

As shown in FIG. 5, the outer peripheral surfaces of each cage bar portion 22, located on both sides of each protrusion 30 in the axial direction, that is, the outer peripheral surfaces of each cage bar portion 22, located between the recess 26 and the pocket 23, each are formed of a first region 35 of an outer peripheral surface adjacent to the recess 26 and a second region 36 of an outer peripheral surface adjacent to the pocket 23. The first region 35 of the outer peripheral surface is formed in a circular arc surface having substantially the same center of curvature as that of the outer peripheral surface of the cage 14 (outer peripheral surface of the annular portion 21) or a flat surface that is substantially parallel to the outer peripheral surface of the cage 14. In contrast, the second region 36 of the outer peripheral surface is formed in an inclined surface that is inclined toward a radially inner side as it approaches the pocket 23. The dimensional ratio L1:L2 of the first region 35 of the outer peripheral surface to the second region 36 of the outer peripheral surface in the circumferential direction is about 1:2.

Figure 8:
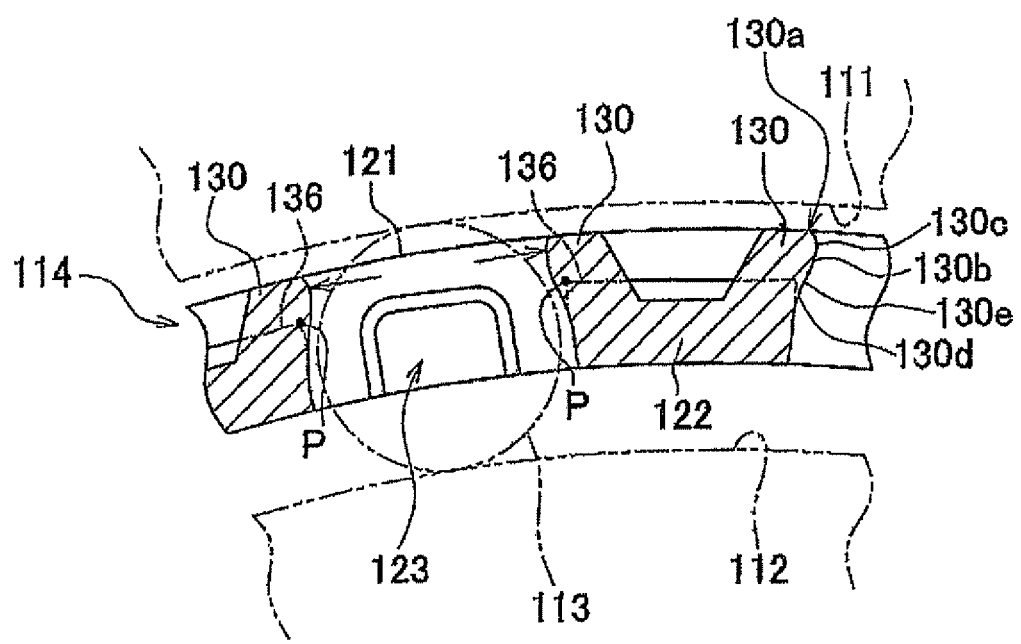
FIG. 8 is a cross-sectional view of a rolling bearing cage according to a related art.
Figure 9A:
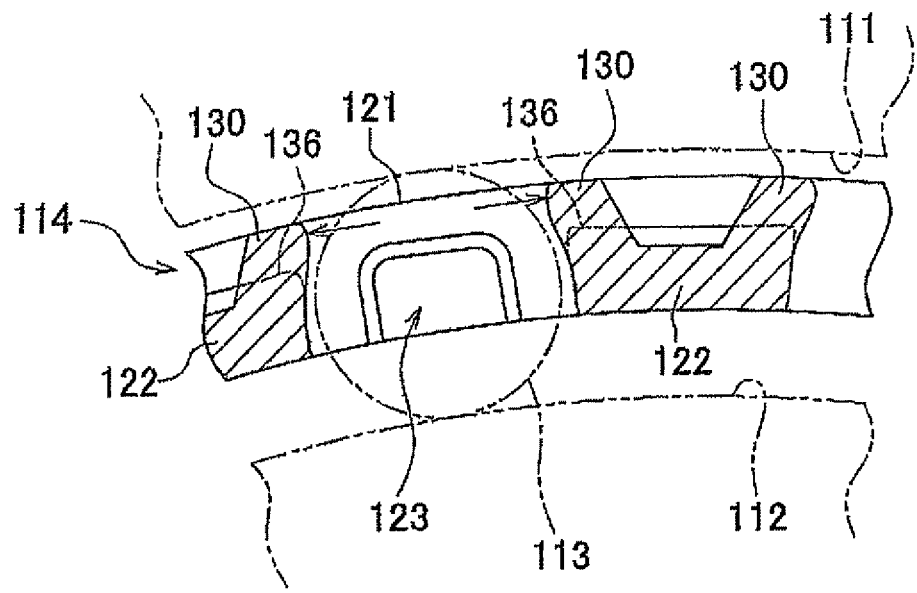
FIG. 9A and FIG. 9B are cross-sectional views of the rolling bearing cage according to the related art.
Figure 9B:
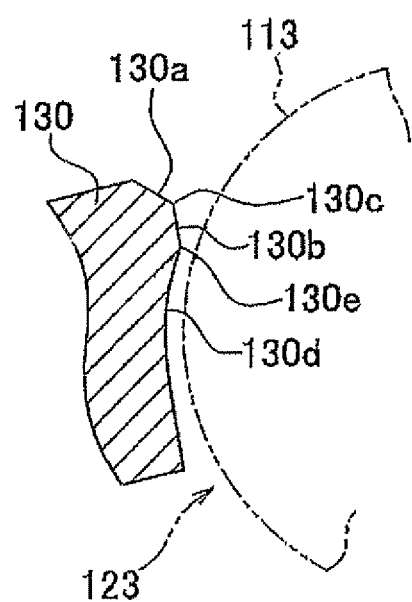

In FIG. 5, the outline of each cage bar portion 22 according to the related art as a comparative example is indicated by the alternate long and two short dashes line (reference numeral 50). On the outer peripheral surface of each cage bar portion 22 according to the related art, there is no inclined surface like the second region 36 of the outer peripheral surface, and the first region 35 of the outer peripheral surface is extended to the pocket 23 side. In the case of this related art, when the cylindrical roller 13 is pushed into the pocket 23 from the radially outer side to elastically deform the protrusions 30 circumferentially outward (arrow X), local stress occurs at the proximal portion of each protrusion 30, particularly, around an edge portion P between the outer peripheral surface 50 and the side surface 22a of the cage bar portion 22, so the proximal portion of each protrusion 30 is easily damaged. Further, in the case of the related art, unlike the present embodiment as shown in FIG. 8, the concave side surface 130d of the protrusion and the side surface 130b that is continuous with a radially outer side thereof are connected with each other via the edge portion 130e. Therefore, each cylindrical roller strongly contacts part of the side surfaces of corresponding ones of the protrusions to thereby damage the protrusions or to generate a large amount of heat. In addition, in the case of the related art, unlike the present embodiment as shown in FIG. 8, the inclined surface 130a of the protrusion and the side surface 130b that is continuous with this inclined surface 130a are connected with each other via the edge portion 130c. Therefore, when each cylindrical roller is pressed into a space between corresponding ones of the protrusions via the introduction surface in assembling an inner ring, cage and rolling element assembly, there is a possibility of the cylindrical roller strongly contacting the edge portion 130c as part of the side surfaces of the protrusions to thereby damage the protrusions.

In contrast, in the present embodiment, each cage bar portion 22 has the second region 36 of the outer peripheral surface formed of the inclined surface, so this elongates a distance from the distal end portion of the protrusion 30, on which a circumferentially outward load (arrow X) acts, to portions (indicated by reference signs P1 and P2) at which stress easily occurs. Furthermore, the portions P1 and P2 at which stress easily occurs are dispersed to multiple portions, angles θ1 and θ2 (an angle θ1 made between the side surface 22a of the cage bar portion 22 and the second region 36 of the outer peripheral surface and an angle θ2 made between the second region 36 of the outer peripheral surface and the first region 35 of the outer peripheral surface) of the respective portions are obtuse angles larger than 90°. By so doing, when the protrusions 30 are elastically deformed, stress that occurs around the proximal portions of the respective protrusions 30 is dispersed to make it possible to prevent occurrence of local stress. Further, in the present embodiment, the side surface of each protrusion 30 adjacent to the pocket has formed thereon the circular arc surface 34 (the second circular arc surface and the introduction surface) that is smoothly continuous with the second guide surface 32 (the first circular arc surface), and there is no edge portion between the second guide surface 32 and the circular arc surface 34. Therefore, when each cylindrical roller 13 is about to dig into a space between corresponding ones of the protrusions 30 while rotating at high speed, a corresponding one of rolling elements can be restrained from strongly contacting part of the side surfaces of the protrusions to thereby damage the protrusions 30 or to generate a large amount of heat. In addition, the introduction surface and the second circular arc surface are formed as the circular arc surface 34 and hence are smoothly continuous with each other without the presence of any edge portion. Therefore, when each cylindrical roller 13 is pressed into a space between corresponding ones of the protrusions 30 via the circular arc surface 34 in assembling the inner ring, cage and rolling element assembly, the gap between the pair of protrusions 30 is easily expanded, and the cylindrical roller 13 can be prevented from strongly contacting part of the side surfaces of the protrusions 30 to thereby damage the protrusions 30.

In addition, each protrusion 30 has the same shape as that of the related art except in that it is equipped with the circular arc surface 34 (the second circular arc surface and the introduction surface) and that the circular arc surface 34 is smoothly continuous with the second guide surface 32 (the first circular arc surface). The rigidity of each protrusion 30 is slightly decreased owing to the inclined surface 36; however, a difference in terms of performance is small. Thus, even when contact force between each protrusion 30 and a corresponding one of the cylindrical rollers 13 increases because of high-speed rotation of the cylindrical roller bearing 10, each protrusion 30 is capable of maintaining sufficient rigidity for the increased contact force.

In the cylindrical roller bearing 10 according to the above described embodiment, the inner ring rib portions 18 are formed on the outer peripheral surface of the inner ring 12, each cage bar portion 22 of the cage 14 has protrusions 30 that protrude toward a radially outer side, and then the inner ring 12, the cage 14 and the cylindrical rollers 13 constitute the inner ring, cage and rolling element assembly. Instead, the aspect of the invention may also be applied to a cylindrical roller bearing 10 in which outer ring rib portions are formed on the inner peripheral surface of the outer ring 11, each cage bar portion 22 of the cage 14 has protrusions 30 that protrude toward the pockets 23 and a radially inner side and that prevent the cylindrical rollers 13 from coming off radially inward from the pockets 23, and then the outer ring 11, the cage 14 and the cylindrical rollers 13 constitute an outer ring, cage and rolling element assembly. In addition, in each case, the rib portion that restricts the position of each cylindrical roller 13 in the axial direction may be formed only at one side of the inner ring 12 or outer ring 11 in the axial direction, and then a separate rib portion may be provided on the other side.

The outer peripheral surface of each cage bar portion 22 has the first region 35 of the outer peripheral surface and the second region 36 of the outer peripheral surface (inclined surface); instead, the first region 35 of the outer peripheral surface is omitted and then the second region 36 of the outer peripheral surface may be elongated by the dimension L1 of the first region 35 of the outer peripheral surface. In addition, the second region 36 of the outer peripheral surface may be a flat inclined surface or may be an inclined surface that curves in a convex or concave shape. The second region 36 of the outer peripheral surface may be formed only at one side of each protrusion 30 in the axial direction.

Figure 6:
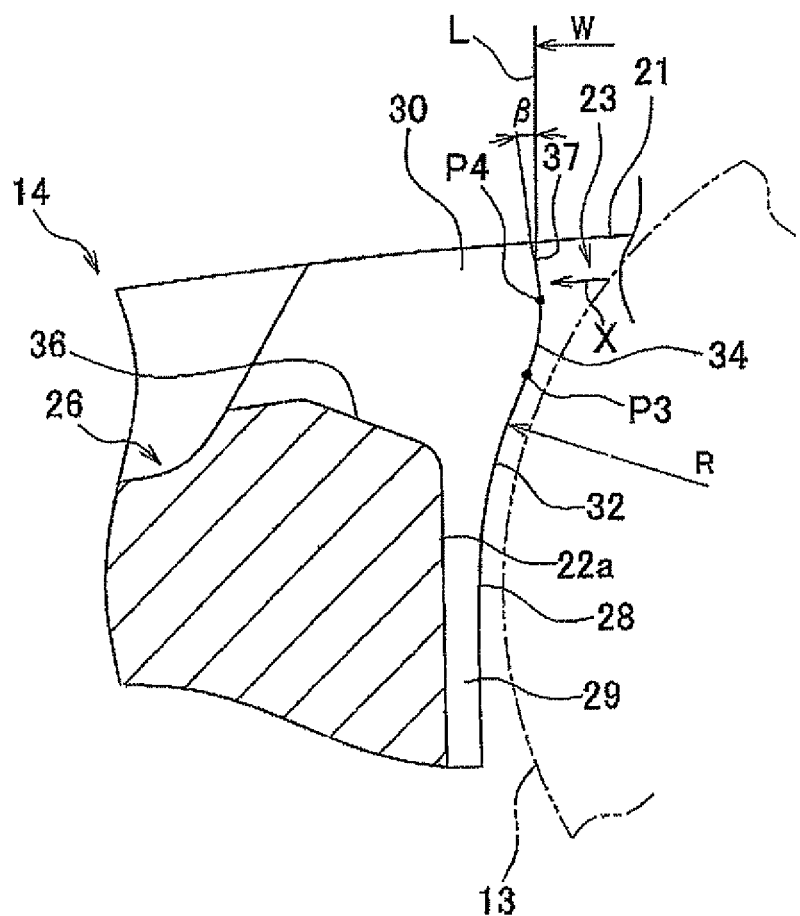
FIG. 6 is an enlarged detail view of the V portion of the cage of the rolling bearing according to the second embodiment in FIG. 4.

Hereinafter, a rolling bearing according to the second embodiment of the invention will be described with reference to FIG. 1 to FIG. 4, FIG. 6 and FIG. 7. In the drawings, like reference numerals denote similar components to those of the first embodiment, and the detailed description thereof is omitted. FIG. 6 is an enlarged view of the V portion of the cage of the roiling bearing according to the second embodiment in FIG. 4.

As shown in FIG. 2 and FIG. 3, the axial guide portions 25 are formed on axially inner side surfaces (side surfaces facing the pockets 23) of the pair of annular portions 21. The axial guide portions 25 are raised toward the pockets 23. The position of each cylindrical roller 13 in the axial direction inside the pocket 23 is restricted in such a manner that the axial end surfaces of the cylindrical roller 13 slide over the distal end surfaces 25a of the axial guide portions 25. Thus, the distal end surfaces 25a of the axial guide portions 25 constitute axial guide surfaces that slidably guide each cylindrical roller 13.

As shown in FIG. 4, the recess 26 that is recessed toward a radially inner side is formed at the center of the outer peripheral surface of each cage bar portion 22 in the circumferential direction over the entire width of the cage bar portion 22 in the axial direction. In addition, circumferential guide portions 29 are formed respectively on the circumferential side surfaces 22a (see FIG. 3) of each cage bar portion 22 at the axial center portion. The circumferential guide portions 29 are respectively raised toward the pockets 23. Furthermore, the protrusions 30 are respectively formed at the axial center portions at both sides of the outer peripheral surface of each cage bar portion 22 in the circumferential direction. Each protrusion 30 protrudes toward the pocket 23 and a radially outer side. The minimum gap W (see FIG. 4) between the pair of protrusions 30 arranged on both sides of each pocket 23 is smaller than the diameter D of each cylindrical roller 13. For example, the gap W has a size of about 88 to 95 percent of the diameter D of each cylindrical roller 13.

As shown in FIG. 6, the position of each cylindrical roller 13 in the circumferential direction inside the pocket 23 is restricted in such a manner that the outer peripheral surface of the cylindrical roller 13 slides over the distal end surfaces of the circumferential guide portions 29 and the side surfaces of the protrusions 30 adjacent to the pocket. Thus, the distal end surfaces of the circumferential guide portions 29 and the side surfaces of the adjacent protrusions 30 constitute circumferential guide surfaces that slidably guide each cylindrical roller 13.

Each circumferential guide surface includes the first guide surface 28 and the second guide surface 32 (the first circular arc surface). The first guide surface 28 is formed in a flat surface that is substantially parallel to a radial line L passing the axis of the cylindrical roller bearing 10. In contrast, the second guide surface 32 is a circular arc surface that is smoothly continuous with the radially outer side of the first guide surface 28 (connected in a differentiable manner (steplessly) with the first guide surface 28 in a cross-section perpendicular to an axial direction of the annular portion 21) and that is formed in a concave shape corresponding to the outer peripheral surface of the cylindrical roller 13. As shown in FIG. 4, the radius of curvature R of each second guide surface 32 is slightly larger than the radius (D/2) of each cylindrical roller 13. For, example, when the radius of each cylindrical roller 13 is 3 mm (diameter D is 6 mm), the radius of curvature R of each second guide surface 32 is set to about 3.1 mm.

In addition, as shown in FIG. 6, the circular arc surface 34 (the second circular arc surface) is formed on the side surface of each protrusion 30 adjacent to the pocket 23 on a radially outer side with respect to the second guide surface 32. The circular arc surface 34 is formed in a convex shape so as to be smoothly continuous (connected in a differentiable manner (steplessly) with the second guide surface in a cross-section perpendicular to the axial direction of the annular portion 21) with the second guide surface 32. Furthermore, an introducing surface 37 is formed on the radially outer side of each circular arc surface 34. The introducing surface 37 is formed in a substantially flat shape so as to be smoothly continuous (connected in a differentiable manner (steplessly) with the circular arc surface 34 in a cross-section perpendicular to the axial direction of the annular portion 21) with the circular arc surface 34. Thus, each circular arc surface 34 has a function of smoothly connecting the second guide surface 32 with the introducing surface 37 without forming an edge portion.

Each introducing surface 37 is formed in an inclined surface that is inclined at an angle β toward a side opposite to the pocket 23 with respect to the radial line L passing the axis of the cylindrical roller bearing 10. In FIG. 6, a connection point (inflection point) between the second guide surface 32 and the circular arc surface 34 is indicated by P3, and a connection point (inflection point) between the circular arc surface 34 and the introducing surface 37 is indicated by P4.

As shown in FIG. 4, each cylindrical roller 13 is held between the pair of protrusions 30 at an angle α (hereinafter, referred to as "wedge angle") made between the center of the cylindrical roller 13 and the inflection points P3 on both sides thereof. When the value of the wedge angle α is small, the protrusions 30 surround the cylindrical roller 13 in a wide range. Thus, the behavioral stability of the cylindrical roller 13 improves, and it is advantageous in that the cylindrical roller bearing 10 is rotated at high speed. However, when the value of the wedge angle α is small, as will be described later, it is difficult to insert the cylindrical roller 13 into between the pair of protrusions 30 and there is a drawback that assembling ability is poor. On the other hand, when the value of the wedge angle α is large, the result is opposite. In the present embodiment, the value of the wedge angle α is set to range from about 120° to about 140°. This achieves a good balance between the high-speed rotation performance and assembling ability of the cylindrical roller bearing 10. Note that the relationship between the wedge angle α and the radius of curvature r of the circular arc surface 34 will be described later.

The cylindrical roller bearing 10 according to the present embodiment is assembled as follows. First, in a state where the cage 14 is placed on the outer peripheral side of the inner ring 12, each cylindrical roller 13 is inserted from the radially outer side into between the pair of protrusions 30 and then the cylindrical roller 13 is fitted into the pocket 23. By so doing, an "inner ring, cage and rolling element assembly" in the intermediate stage of the cylindrical roller bearing 10 is assembled. Then, the outer ring 11 is fitted to the outer peripheral portion of the inner ring, cage and rolling element assembly to thereby finish the cylindrical roller bearing 10.

When the inner ring, cage and rolling element assembly is assembled as described above, because the introducing surface 37 formed of the inclined surface is formed at the distal end of each protrusion 30 as shown in FIG. 6, the gap W between the pair of protrusions 30 is easily expanded circumferentially outward (arrow X direction) when each cylindrical roller 13 is inserted into the pair of protrusions 30. In addition, the circular arc surface 34 that is smoothly continuous with the introducing surface 37 is formed. This reduces contact pressure that is exerted on the protrusions 30 by the cylindrical roller 13 passing through the gap W. Thus, the protrusions 30 are prevented from being damaged. Note that the inclination angle β of each introducing surface 37 may range from 2° to 30°. In addition, in a state of the inner ring, cage and rolling element assembly, the protrusions 30 of the cage 14 prevent the cylindrical rollers 13 from coming off radially outward from the pockets 23.

When each cylindrical roller 13 tries to bite into between the pair of protrusions 30 because of high-speed rotation of the cylindrical roller bearing 10, there is no edge portion between the second guide surface (circular arc surface) 32 and the circular arc surface 34, and the second guide surface 32 is smoothly continuous with the circular arc surface 34. Therefore, it is possible to prevent a situation that contact pressure exerted on the protrusions 30 by each cylindrical roller 13 partially increases to damage the protrusions 30 or increase, heat generated at contact portions. By so doing, it is possible to enhance the high-speed rotation performance of the cylindrical roller bearing 10.

Figure 7:
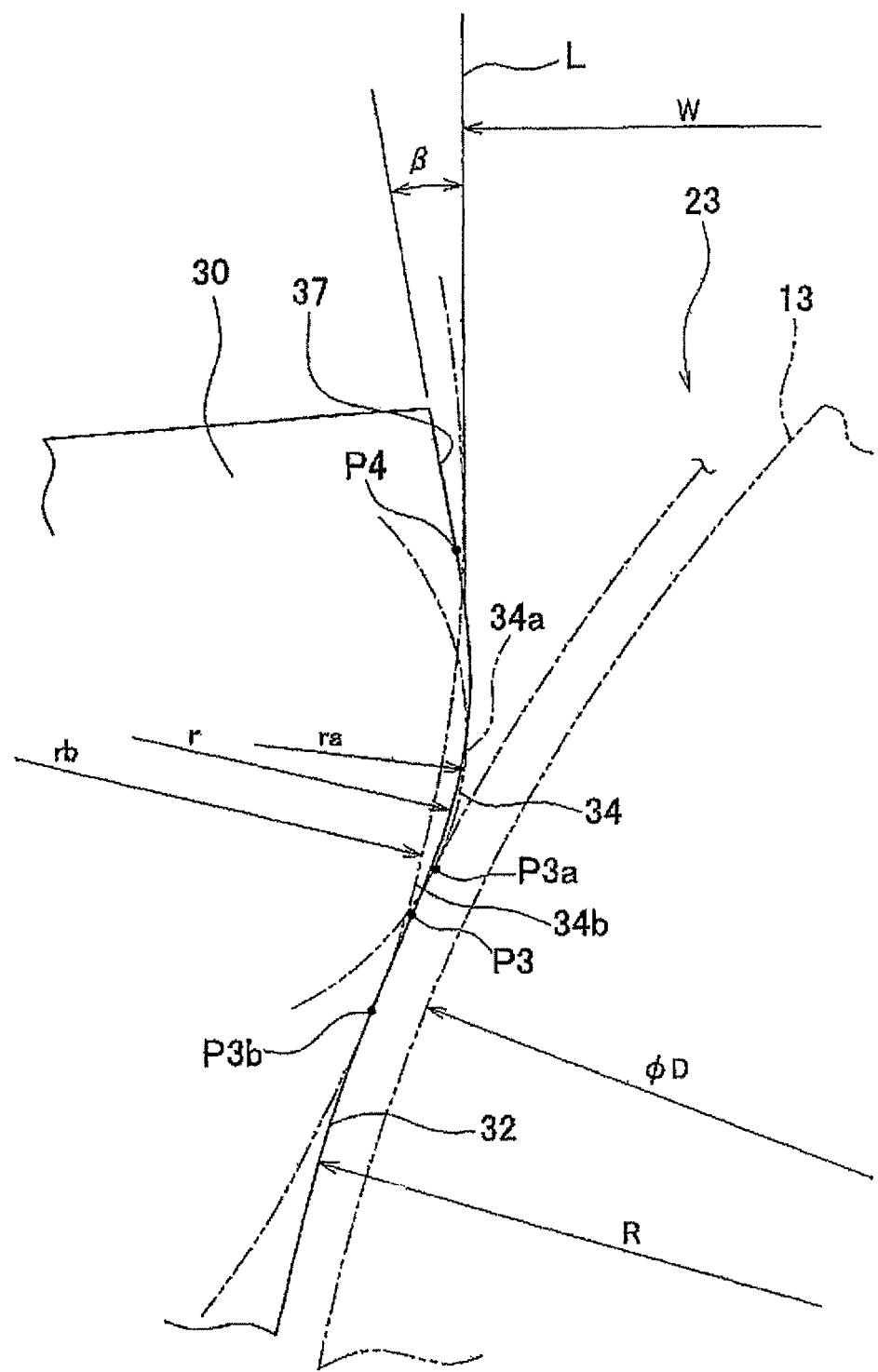
FIG. 7 is an enlarged view that illustrates the structure around a circular arc surface.

Next, the radius of curvature r of each circular arc surface 34 formed between the second guide surface 32 and the introducing surface 37 will be described in detail. FIG. 7 is an enlarged view that illustrates the structure around each circular arc surface 34. The radius of curvature r of each circular arc surface 34 is set to have the following relationship with respect to the diameter D of each cylindrical roller 13.

$$0.1 \leq r/D \leq 0.3 \tag{1}$$

In FIG. 7, two circular arc surfaces 34a and 34b are shown as a comparative example (see the alternate long and two short dashes line). The radius of curvature ra of one circular arc surface 34a is smaller than the radius of curvature r of the circular arc surface 34, and the radius of curvature rb of the other circular arc surface 34b is larger than the radius of curvature r of the circular arc surface 34 according to the present embodiment.

Assuming that the minimum gap W between the pair of protrusions 30 is constant, when the radius of curvature of the circular arc surface is small (when the circular arc surface is 34a), a connection point P3a with the second guide surface 32 is located on the radially outer side with respect to the connection point P3 according to the present embodiment. On the other hand, when the radius of curvature of the circular arc surface is large (when the circular arc surface is 34b), a connection point P3b with the second guide surface 32 is located on the radially inner side with respect to the connection point P3 according to the present embodiment.

Thus, when the connection point P3a with the second guide surface 32 is located on the radially outer side with respect to the connection point P3 according to the present embodiment, the wedge angle α (see FIG. 2) becomes smaller. Therefore, the behavioral stability of each cylindrical roller 13 is enhanced to make it possible to improve the high-speed rotation performance of the cylindrical roller bearing 10. However, contact pressure that is exerted on the protrusion 30 by each cylindrical roller 13 near the connection point P3a increases, so there is a drawback that the protrusion 30 is easily damaged. When the connection point P3b with the second guide surface 32 is located on the radially inner side with respect to the connection point P3 according to the present embodiment, the wedge angle α becomes larger.

Therefore, each cylindrical roller 13 is easily engaged between the pair of protrusions 30 to increase resistance, so there is a drawback that heat is easily generated. This is disadvantageous in terms of high-speed rotation performance.

In terms of this point, in the present embodiment, the radius of curvature r of each circular arc surface 34 is set as expressed by the mathematical expression (1). This achieves a good balance between prevention of damage to the protrusions 30 and improvement in high-speed rotation performance of the cylindrical roller bearing 10.

In the cylindrical roller bearing 10 according to the above described second embodiment, the inner ring rib portions 18 are formed on the outer peripheral surface of the inner ring 12, each cage bar portion 22 of the cage 14 has protrusions 30 that protrude toward a radially outer side, and then the inner ring 12, the cage 14 and the cylindrical rollers 13 constitute the inner ring, cage and rolling element assembly. Instead, the aspect of the invention may also be applied to a cylindrical roller bearing 10 in which outer ring rib portions are formed on the inner peripheral surface of the outer ring 11, each cage bar portion 22 of the cage 14 has protrusions 30 that protrude toward the pockets 23 and a radially inner side and that prevent the cylindrical rollers 13 from coming of radially inward from the pockets 23, and then the inner ring 11, the cage 14 and the cylindrical rollers 13 constitute an outer ring, cage and rolling element assembly. In addition, in each case, the rib portion that restricts the position of each cylindrical roller 13 in the axial direction may be formed only at one side of the inner ring 12 or outer ring 11 in the axial direction, and then a separate rib portion may be provided on the other side.

What is claimed is:

1. A rolling bearing cage comprising:
   a first annular portion and a second annular portion that are formed in an annular shape and that are concentrically provided parallel to each other;
   a plurality of cage bar portions that are spanned between the first annular portion and the second annular portion at a constant interval in a circumferential direction of the first annular portion; and
   a plurality of pockets that are defined by the first annular portion and the second annular portion and two adjacent ones of the plurality of cage bar portions and that are provided in the circumferential direction of the first annular portion, wherein each pocket accommodates a corresponding one of rolling elements of a rolling bearing, wherein:
   each of two adjacent ones of the plurality of cage bar portions that sandwich a corresponding one of the pockets has a protrusion that protrudes toward the pocket and a radially outer side of the first annular portion and that retains a corresponding one of the rolling elements from the radially outer side of the first annular portion;
   a side surface of each cage bar portion and the corresponding protrusion, facing the pocket, has a guide surface that slidably guides a corresponding one of the rolling elements;
   the guide surface include a first circular arc surface that is formed in a concave shape corresponding to an outer peripheral surface of each rolling element;
   the side surface of each protrusion, facing the pocket, has a second circular arc surface that is formed in a convex shape, and that is smoothly continuous with a radially outer side of the first circular arc surface and an introducing surface that is smoothly continuous with a radially outer side of the second circular arc surface and that is inclined to a side opposite to the pocket toward a distal end of the protrusion;
   each protrusion is provided between a first outer peripheral surface and a second outer peripheral surface of a corresponding one of the cage bar portions in an axial direction of the first annular portion, and the first outer peripheral surface and the second outer peripheral surface are adjacent to a proximal portion of the protrusion; and
   at least one of the first outer peripheral surface and the second outer peripheral surface has an inclined surface that is inclined to a radially inner side toward the pocket.

2. The rolling bearing cage according to claim 1, wherein each of the first outer peripheral surface and the second outer peripheral surface has the inclined surface.

3. The rolling bearing cage according to claim 1, wherein a radius of curvature of each second circular arc surface is set to have the following relationship with respect to a diameter of each rolling element: $0.1 \leq r/D \leq 0.3$, where r is the radius of curvature of each second circular arc surface and D is the diameter of each rolling element.

4. An assembly comprising:
   an inner ring that has a raceway on its outer peripheral surface and that has a rib portion protruding toward a radially outer side on at least one side of the raceway in an axial direction;
   a cage that is arranged on a radially outer side of the inner ring and that includes a first annular portion and a second annular portion that are formed in an annular shape and that are concentrically provided parallel to each other, a plurality of cage bar portions that are spanned between the first annular portion and the second annular portion at a constant interval in a circumferential direction of the first annular portion, and a plurality of pockets that are defined by the first annular portion and the second annular portion and two adjacent ones of the plurality of cage bar portions and that are provided in the circumferential direction of the first annular portion, wherein each pocket accommodates a corresponding one of rolling elements of a rolling bearing, wherein each of two adjacent ones of the plurality of cage bar portions that sandwich a corresponding one of the pockets has a protrusion that protrudes toward the pocket and a radially outer side of the first annular portion and that retains a corresponding one of the rolling elements from the radially outer side of the first annular portion, a side surface of each cage bar portion and the corresponding protrusion, facing the pocket, has a guide surface that slidably guides a corresponding one of the rolling elements, the guide surface includes a first circular arc surface that is formed in a concave shape corresponding to an outer peripheral surface of each rolling element, and the side surface of each protrusion, facing the pocket, has a second circular arc surface that is formed in a convex shape, and that is smoothly continuous with a radially outer side of the first circular arc surface and an introducing surface that is smoothly continuous with a radially outer side of the second circular arc surface and that is inclined to a side opposite to the pocket toward a distal end of the protrusion; and
   the plurality of rolling elements that are accommodated in the respective pockets of the cage and that are arranged so as to freely roll along the raceway of the inner ring, wherein:
   each protrusion is provided between a first outer peripheral surface and a second outer peripheral surface of a corresponding one of the cage bar portions in the axial direction of the first annular portion, and the first outer peripheral surface and the second outer peripheral surface are adjacent to a proximal portion of the protrusion; and at least one of the first outer peripheral surface and the second outer peripheral surface has an inclined surface that is inclined to a radially inner side toward the pocket.

5. A rolling bearing comprising:

an outer ring that has a raceway on its inner peripheral surface;

an inner ring that has a raceway on its outer peripheral surface and that has a rib portion protruding toward a radially outer side on at least one side of the raceway in an axial direction;

a cage that is radially arranged between the outer ring and the inner ring and that includes a first annular portion and a second annular portion that are formed in an annular shape and that are concentrically provided parallel to each other, a plurality of cage bar portions that are spanned between the first annular portion and the second annular portion at a constant interval in a circumferential direction of the first annular portion and a plurality of pockets that are defined by the first annular portion and the second annular portion and two adjacent ones of the plurality of cage bar portions and that are provided in the circumferential direction of the first annular portion, wherein each pocket accommodates a corresponding one of rolling elements of the rolling bearing, wherein each of two adjacent ones of the plurality of cage bar portions that sandwich a corresponding one of the pockets has a protrusion that protrudes toward the pocket and a radially outer side of the first annular portion and that retains a corresponding one of the rolling elements from the radially outer side of the first annular portion, a side surface of each cage bar portion and the corresponding protrusion, facing the pocket, has a guide surface that slidably guides a corresponding one of the rolling elements, the guide surface includes a first circular arc surface that is formed in a concave shape corresponding to an outer peripheral surface of each rolling element, and the side surface of each protrusion, facing the pocket, has a second circular arc surface that is formed in a convex shape, and that is smoothly continuous with a radially outer side of the first circular arc surface and an introducing surface that is smoothly continuous with a radially outer side of the second circular arc surface and that is inclined to a side opposite to the pocket toward a distal end of the protrusion; and the plurality of rolling elements that are accommodated in the respective pockets of the cage and that are arranged so as to freely roll along the raceway of the outer ring and the raceway of the inner ring, wherein:

each protrusion is provided between a first outer peripheral surface and a second outer peripheral surface of a corresponding one of the cage bar portions in the axial direction of the first annular portion, and the first outer peripheral surface and the second outer peripheral surface are adjacent to a proximal portion of the protrusion; and at least one of the first outer peripheral surface and the second outer peripheral surface has an inclined surface that is inclined to a radially inner side toward the pocket.

6. A rolling bearing cage comprising:

a first annular portion and a second annular portion that are formed in an annular shape and that are concentrically provided parallel to each other;

a plurality of cage bar portions that are spanned between the first annular portion and the second annular portion at a constant interval in a circumferential direction of the first annular portion; and a plurality of pockets that are defined by the first annular portion and the second annular portion and two adjacent ones of the plurality of cage bar portions and that are provided in the circumferential direction of the first annular portion, wherein each pocket accommodates a corresponding one of rolling elements of a rolling bearing, wherein:

each of two adjacent ones of the plurality of cage bar portions that sandwich a corresponding one of the pockets has a protrusion that protrudes toward the pocket and a radially outer side of the first annular portion and that retains a corresponding one of the rolling elements from the radially outer side of the first annular portion;

each protrusion is provided between a first outer peripheral surface and a second outer peripheral surface of a corresponding one of the cage bar portions in an axial direction of the first annular portion, and the first outer peripheral surface and the second outer peripheral surface are adjacent to a proximal portion of the protrusion; and at least one of the first outer peripheral surface and the second outer peripheral surface has an inclined surface that is inclined to a radially inner side toward the pocket.

* * * * *